United States Patent [19]

Arai et al.

[11] 4,416,168
[45] Nov. 22, 1983

[54] TRANSMISSION AND SUB-TRANSMISSION WITH MUTUALLY CONTENDING HELICAL GEARS

[75] Inventors: Hajime Arai, Aichi; Shoji Haga, Toyota, both of Japan

[73] Assignee: Toyota Jidosha Kogyo Kabushiki Kaisha, Toyota, Japan

[21] Appl. No.: 194,857

[22] Filed: Oct. 7, 1980

[30] Foreign Application Priority Data

Nov. 5, 1979 [JP] Japan .................. 54-143755

[51] Int. Cl.³ .................. F16H 3/06; F16H 3/44
[52] U.S. Cl. .................. 74/740; 74/424.5; 74/781 R
[58] Field of Search .......... 74/740, 424.5, 781 R, 74/694, 700, 701, 782, 783; 192/18 A

[56] References Cited

U.S. PATENT DOCUMENTS

| | | | |
|---|---|---|---|
| 1,431,960 | 10/1922 | Keim | 74/701 |
| 2,242,276 | 5/1941 | Vincent | 74/781 R X |
| 4,164,154 | 8/1979 | Schafer | 74/424.5 X |

FOREIGN PATENT DOCUMENTS 2412736 9/1975 Fed. Rep. of Germany ..... 74/424.5
54-138948 10/1979 Japan ........................ 74/740

Primary Examiner—Rodney H. Bonck
Attorney, Agent, or Firm—Birch, Stewart, Kolasch & Birch

[57] ABSTRACT

A transmission including a main transmission and a subtransmission. The subtransmission is a planetary gear mechanism incoporating a sun gear, planetary pinions, and a ring gear. The main transmission incorporates a tubular intermediate shaft and an output shaft parallel to it, and several pairs of helical gears mounted on the shafts for transmitting rotational power between them. A driven power input shaft passes through the central hole of the tubular intermediate shaft, protrudes from its end, and is connected to a carrier which supports the planetary pinions. The ring gear is connected to the intermediate shaft. The handednesses of the helical ring gear and of at least one of the helical gear wheels on the intermediate shaft are so arranged that when the subtransmission is transmitting power in the speed increasing state, and that helical gear wheel is transmitting power to the power output shaft, the senses of the axial forces exerted on these two gears by the meshing contacts on their teeth are opposed, so that they tend to cancel one another.

5 Claims, 2 Drawing Figures

TRANSMISSION AND SUB-TRANSMISSION WITH MUTUALLY CONTENDING HELICAL GEARS

BACKGROUND OF THE INVENTION

The present invention relates to a transmission for automotive vehicles and the like, and more particularly relates to a transmission which is a combination of a main transmission device and a subtransmission device.

In a copending U.S. patent application Ser. No. 194,380 filed Oct. 6, 1982, now U.S. Pat. No. 4,368,650 made by the same applicants as, and assigned to the same assignees as, the present application, there has been proposed a transmission system for an automotive vehicle which incorporates a main transmission device which is a gear selection type transmission which may be manually shifted to a plurality—in most cases three or more—transmission stages, and which further incorporates an overdrive transmission device or a subtransmission device, which is a planetary gear type transmission which may be shifted between a high speed stage and a low speed stage, i.e., in most cases, a speed increasing stage and a direct connection stage. By the independent shifting of such a main transmission device and such a subtransmission device the number of gear ratios available for use by the driver of the automotive vehicle is increased, and accordingly the drivability of the vehicle, and its fuel consumption and polluting characteristics, are improved.

In such a transmission, as has been described in detail in connection with the aforementioned patent application, a ring gear incorporated in the subtransmission device is connected to the end of an intermediate shaft, which is incorporated in the main transmission device, and which carries several gear wheels for driving a power output shaft. In general in modern transmissions it is preferable to use helically cut gear wheels rather than plain or straight cut gear wheels, because helical gears are generally stronger than plain gears, produce less noise during transmission of rotational power, and last longer. These advantages are usually decisive in the design process. However, when a pair of helical gears are transmitting rotational power, each of them is subjected to an axial force, because of the fact that the teeth of the gears slope where they mesh, and are obliquely skew to their rotational axis rather than parallel thereto. The magnitude of this axial force due to the contact between a pair of teeth of the meshing gears is, substantially, proportional to the force in the circumferential direction of the gears between these teeth, multiplied by the tangent of the angle of skewing of the teeth, i.e. the angle between the directions of the teeth and the rotational axes of the gears. Further, the direction of the axial force on a helical gear, in terms of the rotational direction thereof, of course depends upon the handedness of the gear, i.e., depends on whether its teeth describe left handed or right handed spirals. In such a transmission as outlined above, using helically cut gears, there is therefore a problem of axial loading on the intermediate shaft, which may wear out the bearings upon which the intermediate shaft is supported in the transmission casing, especially if these are radial ball bearings. This problem is particularly troublesome when the subtransmission is being operated in its speed increasing stage, because in this case two separate axial forces are being exerted upon the intermediate shaft: an axial force generated by the meshing of the helical planetary pinion gear of the subtransmission with the helical ring gear thereof, which is transmitted from the ring gear to the intermediate shaft; and also an axial force which is exerted upon the helical gear within the main transmission which is being used for transmitting rotational power to the power output shaft. The combination of these two axial forces can very often prove so powerful as to significantly shorten the life of a bearing supporting the intermediate shaft.

SUMMARY OF THE INVENTION

Therefore, it is an object of the present invention to provide a transmission which is composed of a main transmission and a subtransmission of the abovementioned general construction, in which the axial load produced upon the intermediate shaft thereof is made to be as small as possible.

It is a further object of the present invention to provide such a transmission in which the service life of the bearings supporting the intermediate shaft is made to be as long as possible.

It is a further object of the present invention to provide such a transmission, in which the cost of manufacture thereof is reduced, by reducing the ruggedness and size required for the bearings which support the intermediate shaft thereof.

It is a further object of the present invention to provide such a transmission in which the reliability during service use is maximized.

According to the present invention, these and other objects are provided by a transmission for an automotive vehicle, comprising: (a) a main transmission device comprising: a rotatably supported power output shaft; a tubular intermediate shaft rotatably supported parallel to the power output shaft; and a plurality of helical gears on said shafts for transmitting rotational power between them; the helical engagement of at least one pair of said helical gears, one of which is on said tubular intermediate shaft, exerting a first axial force on said tubular intermediate shaft when said pair of helical gears are transmitting rotational power with said tubular intermediate shaft rotating in a certain rotational direction; (b) a power input shaft coaxial with the tubular intermediate shaft and passing through its central hole, with its one end protruding out of one end of said tubular intermediate shaft, and its other end protruding out of the other end of said tubular intermediate shaft and being driven; and (c) a subtransmission comprising: a helical sun gear; a carrier connected to said one end of the power input shaft; a helical ring gear connected to said one end of the tubular intermediate shaft; and a plurality of helical planetary pinions rotatably supported by the carrier and meshed between the sun gear and the ring gear; (d) when the power input shaft and the carrier are being driven in said certain rotational direction and are rotationally driving the ring gear and the tubular intermediate shaft, via the planetary pinions, in said certain rotational direction, the helical engagement of said planetary pinions and said ring gear exerting a second axial force on said tubular intermediate shaft via said ring gear which is opposed to said first axial force.

According to such a construction, since the axial forces exerted upon the intermediate shaft, during operation of the subtransmission in the speed increasing stage, by the meshing of the ring gear with the planetary pinions, and by the meshing of the aforesaid gear within the main transmission device with its mate on the power output shaft, are opposed, they at least partially cancel one another, and accordingly the size and ruggedness of the bearings which need to support this load in order to maintain the intermediate shaft in its axial location within the casing of the main transmission device may be made smaller, than if these loads were to add together rather than mutually concelling. Accordingly, the service life of such a transmission may be increased without sacrificing the advantages of lightness of weight, compactness, cheapness of manufacture, and ease of assembly. Further, this has been accomplished without increasing the number of parts required for the transmission, and without in any way increasing its manufacturing cost, by the particular concept that the "handedness" of the parts employed during construction of the transmission should be such as to provide the abovementioned condition with regard to the directions of the forces imposed upon the intermediate shaft.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENT

Figure 1:
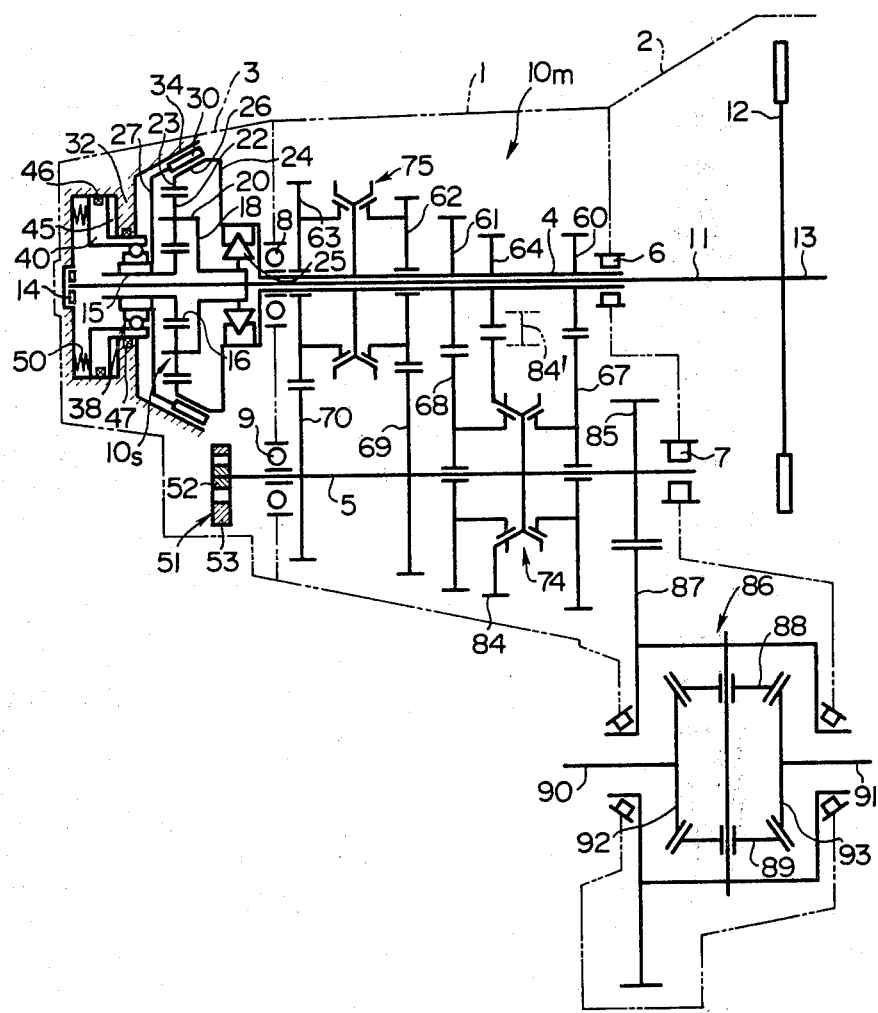
FIG. 1 is a schematic view showing the overall construction of a transmission which is a preferred embodiment of the transmission according to the present invention, and also showing a clutch and a differential which are connected thereto.

The transmission according to the present invention comprises a main transmission device 10m, a subtransmission 10s, and a power input shaft 11. The main transmission 10m is housed within a main casing 1, and the subtransmission 10s is housed within a sub-casing 3. The sub-casing 3 is attached to the left hand end in FIG. 2 of the main casing 1 by bolts or the like, and to the right hand end in FIG. 2 of the main casing 1 is attached a clutch housing 2, again by bolts or the like.

The main transmission device 10m comprises a tubular intermediate shaft 4 and a power output shaft 5. The tubular intermediate shaft 4 is rotatably supported within the main casing 1 at its right hand end in FIG. 2 by a radial roller bearing 6, and at its left hand end by a ball bearing 8. The power output shaft 5 is rotatably supported, parallel to the tubular intermediate shaft 4 and below it in FIG. 2, within the main casing 1, at its right hand end in FIG. 2 by a radial roller bearing 7, and at its left hand end by a ball bearing 9. Within the main casing 1, between the tubular intermediate shaft 4 and the power output shaft 5, there are further provided a plurality of helical gears for transmitting rotational power between these shafts, according to selective engagement thereof, as will be described later.

The tubular intermediate shaft 4 projects a little to the left in the drawing out of the left hand side of the main casing 1. Further, one end of the power output shaft 5, again, projects a little to the left in the drawing out of the left hand side of the main casing 1.

Through the center of the intermediate shaft 4, and coaxial therewith, there passes the power input shaft 11. The power input shaft 11 is rotatable within the intermediate shaft 4 on plain bearings. The right hand end in the drawing of the power input shaft 11 is connected via a clutch 12 to the power output shaft 13 of an internal combustion engine (not shown) which drives the automobile to which this transmission system is fitted, and the left hand end in the figures of the power input shaft 11 projects out from the left hand end of the intermediate shaft 4 for a certain distance and is rotatably supported by a plain bearing 14 which is mounted in the sub-casing 3.

The sub-casing 3 is attached to the left hand side in the drawings of the main casing 1, as described above, by fixing means. When these fixing means are disengaged, the sub-casing 3 may be removed in the left hand direction in the drawings from the main casing 1, along with the subtransmission 10s, and will leave projecting from the main casing 1 only the end of the power output shaft 5, the end of the intermediate shaft 4, and projecting from this the end of the power input shaft 11, all three of which shafts have splines formed thereon, as will be explained later. Accordingly, in applications for the main transmission device 10m incorporating the main casing 1 in which it is not required to provide any subtransmission such as the subtransmission 10s shown in the drawings, it will be relatively easy to mount a simple connecting member between the splines on the intermediate shaft 4 and the splines on the power input shaft 11 which projects out therefrom, in order fixedly to couple these two shafts together so as to utilize the main transmission device 10m incorporating the main casing 1 by itself. This has a useful meaning with regard to flexibility of design and production of various models of automobile.

On the portion of the power input shaft 11 which protrudes out from the end of the intermediate shaft 4, and which is closer to the end of the intermediate shaft 4, there are formed some splines, and to the left of these splines in the drawing the power input shaft 11 is smooth. Upon this smooth end portion of the power input shaft 11 there is mounted, via plain bearings 17, a helically cut sun gear 16 which is formed with a hub extension 15 protruding leftwards from it in the drawings. Thus, the helical sun gear 16 is rotatably supported upon the power input shaft 11.

The helical sun gear 16 is axially slidable on the plain bearings 17 for a certain distance to the left and the right in the drawings on the input shaft 11.

On the aforesaid splined portion of the power input shaft 11 nearer to the end of the intermediate shaft 4, there is mounted a carrier 18 which has internal splines, so that the carrier 18 is rotationally fixed to the power input shaft 11. The carrier 18 is fitted with a pinion shaft 20, which is penetrated into a hole in the carrier 18 and is fixed therein by an engagement pin 18'. The pinion shaft 20 rotatably supports, via a needle bearing 21, a helically cut planetary pinion 22. In fact, in the shown embodiment, there are provided several pinion shafts such as 20, and several planetary pinions such as 22, but only one of each of them is shown in the drawing. On the end of the pinion shaft 20 remote from the carrier 18 there is mounted a cover 19. The planetary pinion 22 is meshed with the helical sun gear 16, and, when the carrier 18 rotates with respect to the helical sun gear 16, performs planetary motion around the helical sun gear 16 in a per se well known fashion.

To the aforesaid splines on the end of the intermediate shaft 4 thee is engaged a connecting member 24, which is thereby rotationally coupled to the intermediate shaft 4. A helically cut ring gear 23 is mounted on the connecting member 24, and the inside of this helical ring gear 23 is meshed with the helical planetary pinion 22. Accordingly, the helical ring gear 23 is rotationally coupled to the intermediate shaft 4. Between the carrier 18 of the helical planetary pinions 22 and this connecting member 24 there is mounted a one way clutch 25. This one way clutch 25 is so constructed as to connect the carrier 18 rotationally to the connecting member 24, i.e. to the helical ring gear 23, when the carrier 18 attempts to rotate at a higher speed in the normal direction of rotation provided by the engine of the automobile, than the connecting member 24.

On the outer circumference of the helical ring gear 23 there is formed a conical clutch facing 26. A brake member 32, which is formed as a disk 37 and a ring 33 mounted to the outer circumference of the disk, is fixed by a bolt 36 (actually a plurality of bolts 36 are provided but only one is shown in the drawing) to the rear sub-casing 3. The disk 37 has a central hole. The inner circumferential surface of the ring 33 is formed as a conical brake facing 34 opposing the conical clutch facing 26 formed on the helical ring gear 23 with a certain gap therebetween.

A frictional engagement member 27 is formed of three parts: a tubular hub portion 28, a disk portion 29 attached to the right hand end in the drawing of the hub 28 and extending outward therefrom, and a cone portion 30 extending in the right hand direction in the drawing from the outer circumference of the disk portion 29, and projecting between the conical clutch facing 26 and the conical brake facing 34. On the inner circumference of the cone portion 30 there is attached an annular clutch pad 31, and on the outer circumference of the cone portion 30 there is attached an annular brake pad 35. The hub portion 28 of the frictional engagement member 21 is supported on the hub extension 15 of the helical sun gear 16, and is rotationally connected thereto by splines.

In the shown embodiment, the frictional engagement member 27 is also axially fixed to the helical sun gear 16. Because the helical sun gear 16 is axially movable through a certain range along the smooth end portion of the power input shaft 11, as mentioned above, thereby the frictional engagement member 27 is axially displacable between a first position, to the right in the drawing, wherein the annular clutch pad 31 engages the conical clutch facing 28 formed on the helical ring gear 23, and accordingly the helical sun gear 16, the frictional engagement member 27, and the helical ring gear 23 are all rotationally coupled together, and a second position, to the left in the drawing, wherein the annular brake pad 35 engages with the conical brake facing 34 formed on the brake member 32, and accordingly the helical sun gear 16, the frictional engagement member 27, and the sub-casing 3 are all rotationally coupled together, via the brake member 32.

The arrangements for displacing the frictional engagement member 27 between its aforesaid first and second positions will now be described. On the outer circumference of the hub portion 28 of the frictional engagement member 27 there is fitted an inner race 39. Running in this inner race 39 there are provided a plurality of balls 43. A piston member 40 is formed of a disk 42 with a hole through its center, and a hub portion 41 protruding in the right hand direction in the drawing from the inner circumference of the disk 42. An outer race, engaged with the balls 43, is directly cut on the inner surface of the hub portion 41. This outer race, the balls 43, and the inner race 39, together constitute a ball bearing 38, which engages the piston member 40 to the frictional engagement member 27 in such a fashion that these members are axially fixed with respect to one another, but are rotationally free with respect to one another.

The disk portion 42 of the piston member 40 is fitted into a circular hole formed in the inner side of the left hand end in the drawing of the sub-casing 3, and a fluid seal is positively ensured between these two members by a seal member 46 mounted in an outer groove on the disk portion 42 of the piston member 40. The outer circumference of the hub portion 41 of the piston member 40 is engaged with the inner circumference of the central hole pierced through the disk portion 37 of the brake member 32, and further between these two members there is mounted a seal member 47, which is seated in a circumferential groove formed on the aforesaid inner circumferential surface of the central hole through the disk member 37, and which positively ensures a fluid seal against the hub portion 41. Accordingly, an annular chamber 45 is defined around the hub portion 41 of the piston member 40, by the cooperation of the sub-casing 3 and the piston member 40, on the right hand side in the drawing of the disk portion 42. This annular chamber 45 is sealed by the seal members 46 and 47, and constitutes an actuating fluid pressure chamber for driving the piston member 40.

In order to prevent rotational movement between the piston member 40 and the sub-casing 3, without hindering axial movement of the piston member 40 within the sub-casing 3, an indexing pin 48 is mounted in a hole in the disk portion 42 of the piston member 40, and its end protrudes across the pressure chamber 45 and its tip is projected into a hole 49 formed in the disk portion 37 of the brake member 32. Accordingly, as this pin 48 slides in and out of the hole 49, the piston member 40 can move axially to and fro within the sub-casing 3, increasing and decreasing the size of the annular fluid pressure chamber 45, freely, but cannot rotate with resect to the sub-casing 3.

On the left hand side in the drawing of the piston member 40, between the disk portion 42 and the sub-casing 3, there is fitted an annular disk spring 50, which urges the piston member 40 and, connected thereto, the frictional engagement member 27 to the right in the drawing, i.e. urges the frictional engagement member 27 to its said first position wherein it is frictionally engaged to the helical ring gear 23. Further, hydraulic fluid pressure is supplied to the annular fluid pressure chamber 45, via passages 54 and 55 formed in the sub-casing 3, under the control of a switching system, not shown in the drawing, from a rotary hydraulic fluid pressure pump 51. This pump 51 comprises an outer rotor 53 which is fixed to the sub-casing 3, and an inner rotor 52 which is, via splines, drivingly engaged to the left hand end of the power output shaft 5 which projects out from the main casing 1, as described above.

The sub-transmission described above operates as follows. When no hydraulic fluid pressure is supplied to the annular fluid pressure chamber 45, then the piston member 40 is biased to the right in the drawing under the resilient force of the disk spring 50, and accordingly the frictional engagement member 27 is also biased to the right in the drawing, i.e., towards its first position wherein, via the clutch pad 31, its cone portion 30 is frictionally engaged to the conical clutch facing 26 formed on the helical ring bear 23. In this state, therefore, the helical sun gear 16 and the helical ring gear 23 are rotationally coupled to one another, and accordingly the planetary gear mechanism as a whole, including the carrier 18 and the connecting member 24, is in a locked state. Accordingly, the power input shaft 11, which is splined to the carrier 18, is rotationally coupled to the intermediate shaft 4, which is splined to the connecting member 24. Accordingly, input power transmitted by the rotation of the crankshaft of the internal combustion engine (not shown) to the power input shaft 11 is directly transmitted to the intermediate shaft 4, without change of the rotational speed thereof. Thence, as will be explained later, via the main transmission device, this rotational power is transmitted to the power output shaft 5. This state of the subtransmission is the directly connecting stage, wherein no increase of rotational speed is provided thereby.

On the other hand, when a specified value of hydraulic fluid pressure is supplied to the annular fluid pressure chamber 45, then the pressure exerted on the right hand side of the disk portion 42 of the piston member 40 drives the piston member 40 to the left in the drawing, against the biasing action of the disk spring 50, and the frictional engagement member 27 is also moved to the left in the drawing, because it is coupled to the piston member 40 by the bearing 38, and cannot be moved with respect thereto in the axial direction. As a matter of fact, in this embodiment, because the frictional engagement member 27 is axially fixed to the tubular extension 15 of the helical sun gear 16, the helical sun gear 16 also moves a little to the left in the drawing at this time, by the sliding of the plain bearings 17 on the power input shaft 11, with respect to the sub-casing 3, but this does not substantially affect the condition of meshing between the helical sun gear 16 and the helical planetary pinion 22. However, the movement of the frictional engagement member 27 to the left in the drawing disengages the conical clutch pad 31 from the conical clutch facing 26 formed on the helical ring gear 23, and engages the conical brake pad 35 with the conical brake facing 34 of the brake member 32, thus stopping the rotation of the frictional engagement member 27, and, accordingly, stopping the rotation of the helical sun gear 16, because the helical sun gear 16 is rotationally fixed to the frictional engagement member 27 and thereby to the sub-casing 3. Accordingly, in this state, the rotation of the power input shaft 11 provided by the action of the internal combustion engine (not shown) is transmitted, via the splined portion thereof, to the carrier 18 which carries the helical planetary pinion 22, and in a per se well known way is transmitted to the helical ring gear 23 at an increased rotational speed, i.e., at a reduction gearing ratio smaller than unity. That is to say, the helical ring gear 23 rotates faster than does the power input shaft 11, and accordingly the connecting member 24, which is connected to the helical ring gear 23, and the intermediate shaft 4, which is splined to the connecting member 24, likewise rotate at a higher rotational speed than does the power input shaft 11. Thus, the shown embodiment of the subtransmission provides its so-called speed increasing stage.

Accordingly, by the selective supply of hydraulic fluid pressure to the annular fluid pressure chamber 45, the frictional engagement member 27 may be driven between its first and its second positions, and, according to this, the subtransmission shown provides either the direct connection stage, or the speed increasing stage. This is accomplished, as explained above, with a very compact construction, which is economical of space.

By the shown construction in which the outer race of the bearing 38 is directly provided by the inner part of the hub portion 41 of the piston member 40, the radial dimension of the connecting structure between the piston member 40 and the frictional engagement member 27 may be much reduced, thereby lightening the construction. Further, because the number of parts in the construction is reduced, it is easy and cheap to make, and reliable in service.

In the shown embodiment axial displacement of the frictional engagement member 27 has been possible, although in fact this frictional engagement member 27 is axially as well as rotationally coupled to the helical sun gear 16, by the fact that the helical sun gear 16 is axially displacable within the sub-casing 3 to a certain extent, by sliding along the power input shaft 11 on the plain bearings 17. However, in a different construction, the helical sun gear 16 could be axially fixed within the sub-casing 3, and the frictional engagement member 27 could be axially slidable with respect thereto, as on splines or the like.

Now the construction and operation of the main transmission device 10m will be explained.

As mentioned before, the left hand end in FIG. 2 of the intermediate shaft 4 protrudes slightly out from the left hand side of the main casing 1, and is rotationally coupled to the connecting member 24, which is rotationally coupled to the ring gear 23; while the left hand end in FIG. 2 of the power output shaft 5 also somewhat protrudes out from the left hand side of the main casing 1 and projects into the oil pump 51 to engage with its inner rotor 52. Further, through the central hole of the intermediate shaft 4 there passes the power input shaft 11; but this is not directly connected with the functioning of the main transmission device 10m.

There are arranged four pairs of helical gear wheels within the main casing 1, one of each pair being mounted on the intermediate shaft 4, while the other is mounted on the power output shaft 5; and the two gear wheels of each pair are kept meshed at all times. In more detail: on the intermediate shaft 4 there are mounted in order from the right to the left of FIG. 2: a first speed driving helical gear 60, which is rotationally coupled to the intermediate shaft 4; a second speed driving helical gear 61, which is rotationally coupled to the intermediate shaft 4; a third speed driving helical gear 62, which is rotatably supported on the intermediate shaft 4 via a needle bearing 65; and a fourth speed driving helical gear 63, which is rotatably supported on the intermediate shaft 4 via a needle bearing 66. Further, on the power output shaft 5 there are mounted: a first speed driven helical gear 67, which is rotatably mounted on the power output shaft 5 via a needle roller bearing 71; a second speed driven helical gear wheel 68, which is rotatably mounted on the power output shaft 5 via a needle roller bearing 72; a third speed driven helical gear wheel 69, which is rotationally coupled to the power output shaft 5; and a fourth speed driven helical gear wheel 70, which is also rotationally coupled to the power output shaft 5. The first speed driving and driven gear wheels 60 and 67, the second speed driving and driven gear wheels 61 and 68, the third speed driving and driven gear wheels 62 and 69, and the fourth speed driving and driven gear wheels 63 and 70, are, respectively, mutually meshed at all times.

Between the third speed driven gear 69 and the fourth speed driven gear 70, on the power output shaft 5, there is mounted a spacing collar 73. Further, between the first speed driving gear 60 and the second speed driving gear 61 there is mounted a reverse driving gear 64, rotationally coupled to the intermediate shaft 4, which will be explained hereinafter.

Between the first speed driven gear 67 and the second speed driven gear 68 there is provided a first/second speed synchronizer 74, and between the third speed driving gear 62 and the fourth speed driving gear 63 there is provided a third/fourth speed synchronizer 75. These synchronizers 74 and 75 are per se well known Borg-Warner type synchromesh mechanisms, and they respectively comprise clutch hubs 76 and 77, hub sleeves 78 and 79, shifting keys 80 and 81, synchronizer rings 82, 82 and 83, 83, etc.

The operation of the main transmission device 10m is as follows. The intermediate shaft 4 is rotated by the engine via the subtransmission 10s, as explained above.

When the hub sleeve 78 of the first/second speed synchronizer 74 is at its neutral position, and also the hub sleeve 79 of the third/fourth speed synchronizer 75 is at its neutral position, then rotational power is not transmitted from the intermediate shaft 4 to the power output shaft 5, and accordingly the main transmission 10m is in neutral condition.

Figure 2:
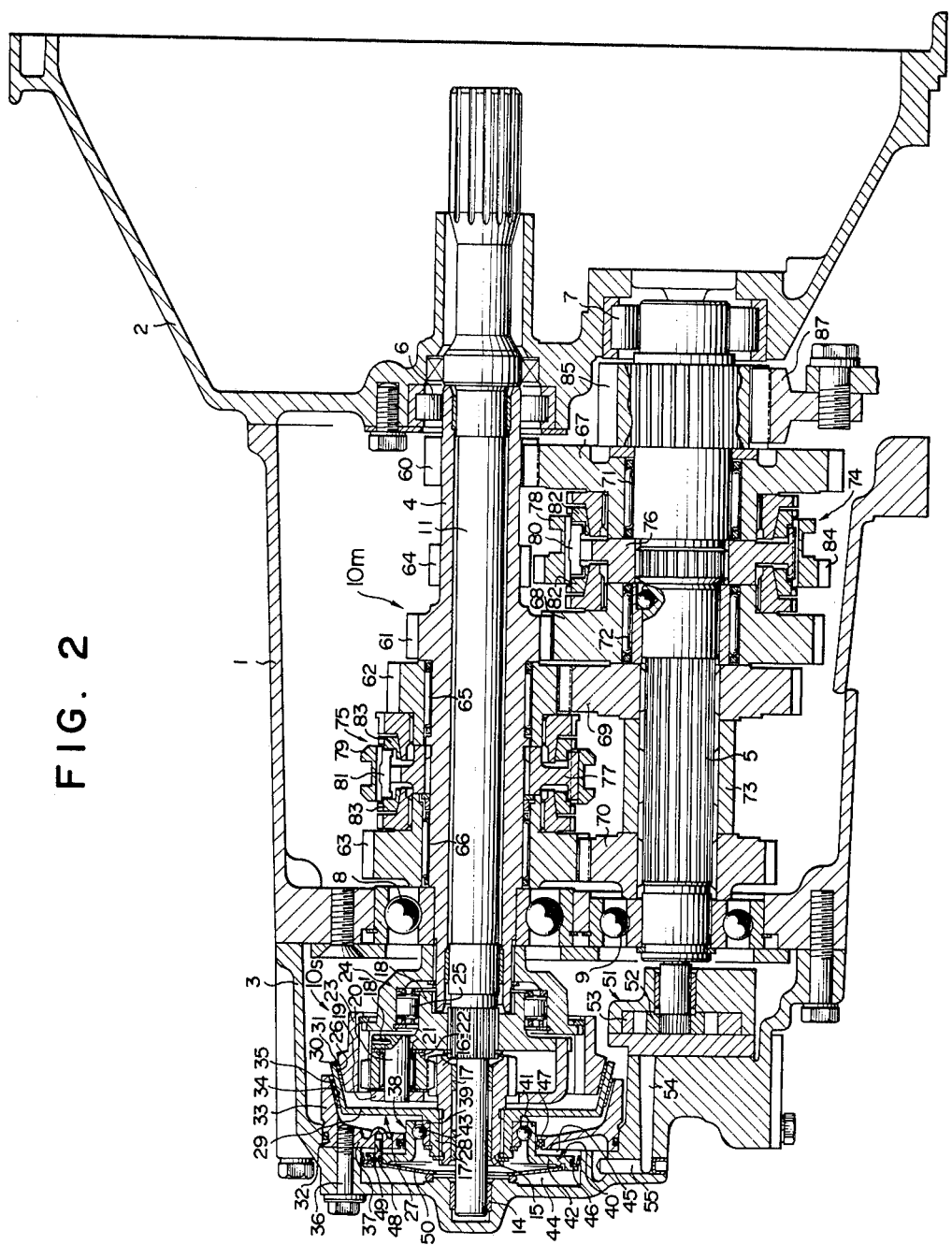
FIG. 2 is a longitudinal cross-sectional view, showing the essential parts of the main transmission device and the subtransmission device of the preferred embodiment of the transmission according to the present invention schematically shown in FIG. 1.

When the hub sleeve 78 of the first/second speed synchronizer 74 is shifted to the right in FIG. 2 from its neutral position, and the hub sleeve 79 of the third/fourth speed synchronizer 75 is at its neutral position, then the clutch hub 76 is engaged to the first speed driven gear 67, and accordingly rotational power is transmitted from the intermediate shaft 4, via the first speed driving gear 60 and the first speed driven gear 67, to the power output shaft 5, and first gear stage is obtained.

When the hub sleeve 78 of the first/second speed synchronizer 74 is shifted to the left in FIG. 2 from its neutral position, and the hub sleeve 79 of the third/fourth speed synchronizer 75 is at its neutral position, then the clutch hub 76 is engaged to the second speed driven gear 68, and accordingly rotational power is transmitted from the intermediate shaft 4, via the second speed driving gear 61 and the second speed driven gear 68, to the power output shaft 5, and second gear stage is obtained.

When the hub sleeve 78 of the first/second speed synchronizer 74 is in its neutral position, and the hub sleeve 79 of the third/fourth speed synchronizer 75 is shifted to the right in FIG. 2 from its neutral position, then the clutch hub 77 is engaged to the third speed driving gear wheel 62, and accordingly rotational power is transmitted from the intermediate shaft 4, via the third speed driving gear 62 and the third speed driven gear 69, to the power output shaft 5, and third gear stage is obtained.

Further, when the hub sleeve 78 of the first/second speed synchronizer 74 is in its neutral position, and the hub sleeve 79 of the third/fourth speed synchronizer 75 is shifted to the left in FIG. 2 from its neutral position, then the clutch hub 77 is engaged to the fourth speed driving gear 63, and accordingly rotational power is transmitted from the intermediate shaft 4, via the fourth speed driving gear 63 and the fourth speed driven gear 70 to the power output shaft 5, and fourth gear stage is obtained.

According to the relative sizes shown in the figures of the gears 60, 61, 62, 63, etc., appropriate gear ratios are provided for the first, second, third, and fourth speed stages.

A reverse gear stage is provided as follows. On the hub sleeve 78 of the first/second speed synchronizer 74 there is formed a reverse driven gear 84, and a reverse intermediate gear 84', which may be seen in schematic form in FIG. 1 but which is not shown in FIG. 2, may be moved so as to engage with the reverse driven gear 84 and the reverse driving gear 64 mentioned above, in order to provide power transmission from the intermediate shaft 4 to the power output shaft 5 in a reversed manner.

The abovementioned displacements of the hub sleeves 78 and 79 of the first/second speed synchronizer 74 and the third/fourth speed synchronizer 75, and the movement of the reverse intermediate gear 84', are performed in a per se well known fashion by manual operation by the driver of the automobile to which the transmission is fitted, by use of a manual shift lever which actuates shift forks, and the like. These details are not shown in the drawings and further description thereof will be omitted.

On the right hand end of the power output shaft 5 there is mounted a power output gear 85, and this is meshed with a ring gear 87 of a differential gear device 86. The ring gear 87 is only shown partially in FIG. 2, and the differential gear device 86 is only shown, in schematic form, in FIG. 1. This differential gear device 86 is of a per se well known sort, adapted for front engine front wheel drive automobiles, and comprises two bevel gears 88 and 89 which are rotatably mounted on a shaft which is parallel to the plane of the ring gear 87 and is mounted as passing perpendicularly though the rotational axis of the ring gear 87 on a frame, and two bevel gears 92 and 93, each of which meshes with both of the bevel gears 88 and 89, and which are respectively mounted on the ends of right and left axles 90 and 91 which are connected to the front wheels of the automobile.

By shifting the main transmission device 10m between its four forward speed stages and its one reverse speed stage, in cooperation with the shifting of the subtransmission device 10s between its direct engagement stage and its speed increasing stage, a totality of ten different transmission speed stages may be obtained from the combination of these transmission devices, between the power input shaft 11 and the power output shaft 5. However, as a practical matter, in general use the subtransmission device 10s is only shifted between its direct engagement stage and its speed increasing stage, according to the operation conditions of the internal combustion engine and the automobile, when the main transmission device 10m is shifted to its third speed stage or its fourth speed stage. Thus, in practice, the combination of the main transmission device 10m and the subtransmission 10s is used to provide six forward speed stages and one reverse speed stage for the automobile.

The particular inventive concept of the present invention is as follows. As has been previously mentioned, the sun gear 16, the planetary pinion gear 22, and the ring gear 23 are helical gears; and also the gears in the main transmission 10m, such as 60, 61, 62, 63, 67, 68, 69, 70, etc., are likewise helical gears. As has been heretofore pointed out, when a pair of helical gears is transmitting rotational power, the gears are subject to equal and opposite axial forces, because of the slanting of the meshing faces of their teeth. The direction of this axial force, with respect to the rotational direction of the gear wheel, is determined by the "handedness" of the gear wheel. In other words, whether the direction of this axial force is the same as the direction of the angular velocity vector of the gear wheel, or is opposite to it, depends on whether the gear wheel is a "left" or a "right" handed gear wheel. Of course, the handedness of the four gear wheels mounted on the intermediate shaft 4, i.e., the gear wheels 60, 61, 62, and 63, must be opposite to the handedness of the four gear wheels mounted on the power output shaft 5, i.e., the gear wheels 67, 68, 69, and 70. According to the present invention, the handedness of the helical planetary pinion gear 22 is arranged to be the same as that of the helical intermediate shaft gear wheels 60, 61, 62, and 63, while the handedness of the sun gear 16 and of the ring gear 23 is arranged to be opposite thereto.

According to this construction, when the combination of the main transmission device 10m and the subtransmission 10s is being operated with the subtransmission 10s in its speed increasing stage, wherein, as explained above, the supply of hydraulic fluid pressure to the chamber 45 biases the piston member 40 and the friction engagement member 27 connected thereto in the left hand direction in the drawing, so as to engage the brake pad 35 against the conical braking surface 34, and so as to immobilize the sun gear 16, then, as the helical planetary pinion 22 rotates around the sun gear 16, being driven by the rotation of the carrier 18 which is coupled to the power input shaft 11, and drives the helical ring gear 23, since the rotational direction of the planetary pinion 22 is the same as the rotational direction of the intermediate shaft 4 which is coupled to the ring gear 23, thereby, since the handedness of the planetary pinion 22 is the same as that of whichever one of the driving gears 60, 61, 62, or 63 is transmitting rotational power to its corresponding driven gear, the axial loads on the ring gear 23 and said driving gear, which are both transmitted to the intermediate shaft 4, are opposite. In other words, these axial forces act to cancel one another, along the intermediate shaft 4. This has the very beneficial effect of reducing the maximum load which is exerted in the axial direction of the intermediate shaft 4. Thus, the axial load upon the ball bearing 8 may be significantly reduced, thus prolonging its useful active life.

On the other hand, when the subtransmission 10s is being operated in its directly connected stage, wherein no hydraulic fluid pressure is supplied to the chamber 45, and accordingly the disk spring 50 is biasing the piston member 41 and the friction engagement member 27 in the right hand direction in the drawings, so that the conical clutch pad 31 is engaging against the clutch face 26 formed on the outside of the ring gear 23, thus locking up the planetary gear mechanism, then of course, as no substantial force is being transmitted by the gears of the planetary gear system, no axial load is thereby being imposed upon the intermediate shaft 4. However, in this condition, a certain axial load is being put upon the intermediate shaft 4 by the pressure of the clutch pad 31 against the clutch face 26. Therefore, as a useful modification of the present invention, it is desirable that the handedness of the gear wheels 60, 61, 62, and 63, should be such that, when they are transmitting rotational power in the direction which is provided by the preferred direction of operation of the internal combustion engine, the axial load which they exert upon the intermediate shaft 4 should be the left hand direction in the drawing, i.e., in a direction opposed to the aforesaid axial load produced by the pressure of the clutch pad 31 against the clutch face 26, so that these two axial loads may at least partially cancel one another.

As a particular desirable specialization of the invention concept of the present invention, it is further desirable that the angle of skewing of the teeth of the ring gear, and the angle of skewing of the teeth of the helical gear on the tubular intermediate shaft which is used for the gear speed stage which is most commonly used in conjunction with the speed increasing stage of the subtransmission 10s should be chosen so that the axial loads on these two gears substantially completely cancel one another. This may be done as follows. Since, during operation using these gears, the torque transmitted by the planetary pinions to the ring gear is equal to the torque transmitted by this helical main transmission gear to its mate on the power output shaft, therefore the force exerted on the teeth of each of these gears must be inversely proportional to the radius of the gear. Accordingly, for the axial loads exerted on the intermediate shaft to be of equal magnitude, the ratio of the radius of the ring gear to the tangent of the skewing angle of its teeth should be approximately equal to the ratio of the radius of said helical main transmission bear to the skewing angle of its teeth. This will ensure that substantially no load is exerted on the intermediate shaft during operation of the transmission system in the speed increasing stage of the subtransmission 10s along with its most frequently associated gear speed stage of the main transmission 10m.

Of course, it is not essential to the present invention that the handednesses of all the gear wheels 60, 61, 62, and 63 should be determined as described above, especially when the speed increasing stage of the subtransmission device 10s is only used when the main transmission device 10m is engaged to its third speed stage or its fourth speed stage; it will be quite within the principles of the present invention for only one of the gear wheels mounted on the intermediate shaft 4 to be of a handedness which ensures that the axial load exerted by it on the intermediate shaft 4 is at least partially cancelled by the axial load exerted on the intermediate shaft 4 by the engagement of the planetary pinion 22 and the ring gear 23.

Although the present invention has been shown and described with reference to a preferred embodiment thereof, and in terms of the illustrative drawings, it should not be considered as limited thereby. Various possible modifications, omissions, and alterations could be conceived of by one skilled in the art of the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawings, but solely by the scope of the appended claims, which follow.

I claim:

1. A transmission for an automotive vehicle, comprising:
   (a) a main transmission device comprising:
   a main casing;
   a rotatably supported power output shaft;
   a tubular intermediate shaft rotatably supported parallel to the power output shaft; and
   a plurality of helical gears on said shafts for transmitting rotational power between them;
   the helical engagement of at least one pair of said helical gears, one of which is on said tubular intermediate shaft, exerting a first axial force on said tubular intermediate shaft when said pair of helical gears are transmitting rotational power with said tubular intermediate shaft rotating in a certain predetermined rotational direction;
   (b) a power input shaft coaxial with the tubular intermediate shaft and passing through its central hole, with its one end protruding out of one end of said tubular intermediate shaft, and its other end protruding out of the other end of said tubular intermediate shaft and being driven; and
   (c) a substransmission comprising:
   a sub-casing;
   a helical sun gear;
   a carrier connected to said one end of the power input shaft;
   a helical ring gear connected to said one end of the tubular intermediate shaft;
   a plurality of helical pinions rotatably supported by the carrier and meshed between the sun gear and the ring gear; and
   a frictional engagement means which selectively connects said sun gear to either said sub-casing or said ring gear, and which comprises a frictional engagement element rotationally connected with said sun gear, a spring which drives said frictional engagement element in a first axial direction opposite to the direction of said first axial force toward engagement with said ring gear and exerts a second axial force on said tubular intermediate shaft via said frictional engagement element and said ring gear when said frictional engagement means is connecting said sun gear to said ring gear, said second axial force opposing to said first axial force, and a fluid pressure actuator which, when actuated, drives said frictional engagement element in a second axial direction opposite to said first axial direction toward engagement with said sub-casing by overcoming said spring;
   wherein the handedness of said ring gear and said pinions is so arranged that, when the power input shaft and the carrier are being driven in said certain rotational direction and are rotationally driving the ring gear and the tubular intermediate shaft via a planetary movement of the planetary pinions, in said certain rotational direction, the helical engagement of said planetary pinions and said ring gear exerts a third axial force on said tubular intermediate shaft via said ring gear wheich is opposed to said first axial force.

2. A transmission according to claim 1, wherein said plurality of helical gears in the main transmission device comprise a plurality of pairs of helical gears, each pair consisting of a driving helical gear mounted on the tubular intermediate shaft and a driven helical gear mounted on the power output shaft, and wherein all of the helical gears on the tubular intermediate shaft are helically cut in the same sense.

3. A transmission according to claim 1, wherein said fluid pressure actuator comprises a piston member which is coaxial with said frictional engagement element and which comprises a disc portion and a hub portion, said hub portion projecting from a central portion of said disc portion on one side thereof and being connected to said frictional engagement element so as to be axially fixed thereto and so as to be rotationally free with respect thereto, an annular fluid pressure chamber being defined around and coaxial with said hub portion by the cooperation of said sub-casing and said piston member on said one side thereof, said spring biasing said piston member in the direction to reduce the volume of said annular fluid pressure chamber, supply of fluid pressure to said annular fluid pressure chamber driving said piston member against the force of said spring in said second axial direction.

4. A transmission according to claim 3, further comprising a bearing structure which connects said hub portion of said piston member to said frictional engagement element, said bearing structure having an outer race provided by said hub portion.

5. A transmission according to claim 3 or 4, further comprising a means for engaging said piston member to said sub-casing so that said piston member is rotationally fixed to said sub-casing but is axially free with respect to said sub-casing.

* * * * *